US012663042B2

(12) United States Patent
Simon

(10) Patent No.: US 12,663,042 B2
(45) Date of Patent: Jun. 23, 2026

(54) PLAIN BEARING FOR AN AIRCRAFT TURBOMACHINE

(71) Applicant: SAFRAN TRANSMISSION SYSTEMS, Colombes (FR)

(72) Inventor: Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/832,432

(22) PCT Filed: Jan. 24, 2023

(86) PCT No.: PCT/FR2023/050091
§ 371 (c)(1),
(2) Date: Jul. 23, 2024

(87) PCT Pub. No.: WO2023/144485
PCT Pub. Date: Aug. 3, 2023

(65) Prior Publication Data
US 2025/0154986 A1      May 15, 2025

(30) Foreign Application Priority Data

Jan. 28, 2022    (FR) ...................................... 2200768

(51) Int. Cl.
*F16C 33/10* (2006.01)

(52) U.S. Cl.
CPC ...... *F16C 33/1065* (2013.01); *F16C 33/1045* (2013.01); *F16C 2326/43* (2013.01); *F16C 2360/24* (2013.01); *F16C 2361/61* (2013.01)

(58) Field of Classification Search
CPC .............. F16C 33/1045; F16C 33/1055; F16C 33/1065; F16C 2326/43; F16C 2360/23;
(Continued)

(56) References Cited

U.S. PATENT DOCUMENTS 6,966,700 B2    11/2005  Weissbacher
10,436,249 B2    10/2019  Hoelzl
(Continued)

FOREIGN PATENT DOCUMENTS

DE          1985822 U      5/1968
EP          2383480 A1    11/2011
(Continued)

OTHER PUBLICATIONS

International Search Report received for PCT Patent Application No. PCT/FR2023/050091, mailed on Apr. 25, 2023, 6 pages (2 pages of English Translation and 4 pages of Original Document).

*Primary Examiner* — Alan B Waits
(74) *Attorney, Agent, or Firm* — WOMBLE BOND DICKINSON (US) LLP

(57)          ABSTRACT
A plain bearing for an aircraft turbomachine, the plain bearing having a tubular body including an outer cylindrical surface, an inner cavity designed to contain oil, a primary lubrification groove formed by a middle portion of the outer surface and a main channel for supplying the primary groove with oil, the plain bearing wherein the outer surface of the body further includes at least one secondary lubrification groove which is formed in an end portion of the outer surface and is independent of the primary groove, and in that the body further includes a secondary channel for supplying the or each secondary groove with oil.

15 Claims, 7 Drawing Sheets

(58) Field of Classification Search
CPC .............. F16C 2360/24; F16C 2361/61; F16H
57/043; F16H 57/0456; F16H 57/0469;
F16H 57/0471; F16H 57/0479; F16H
57/0482–0486
See application file for complete search history.

(56) References Cited

U.S. PATENT DOCUMENTS

| | | | |
|---|---|---|---|
| 2012/0108380 A1 | 5/2012 | Dinter et al. | |
| 2014/0254966 A1 | 9/2014 | Zhou et al. | |
| 2015/0078689 A1* | 3/2015 | Sieveking | F16C 33/1055 |
| | | | 384/289 |
| 2018/0313404 A1* | 11/2018 | Hoelzl | F16C 17/02 |
| 2020/0271059 A1* | 8/2020 | Lemoine | F02K 3/06 |
| 2020/0271217 A1* | 8/2020 | Lemoine | F01D 25/18 |
| 2020/0347882 A1* | 11/2020 | Martin | F16H 57/043 |
| 2023/0054545 A1* | 2/2023 | Martin | F02C 7/36 |
| 2024/0084711 A1* | 3/2024 | Pap | F02C 7/36 |

FOREIGN PATENT DOCUMENTS

| | | | |
|---|---|---|---|
| FR | 2995055 A1 | 3/2014 | |
| FR | 3071022 A1 | 3/2019 | |
| WO | 2014/037659 A1 | 3/2014 | |

* cited by examiner

[Fig. 1]
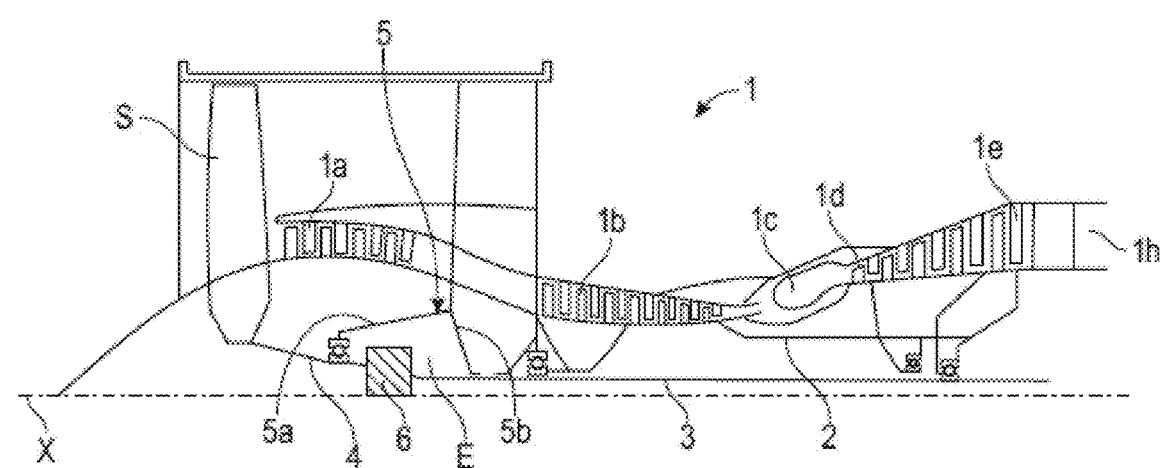

[Fig. 2]
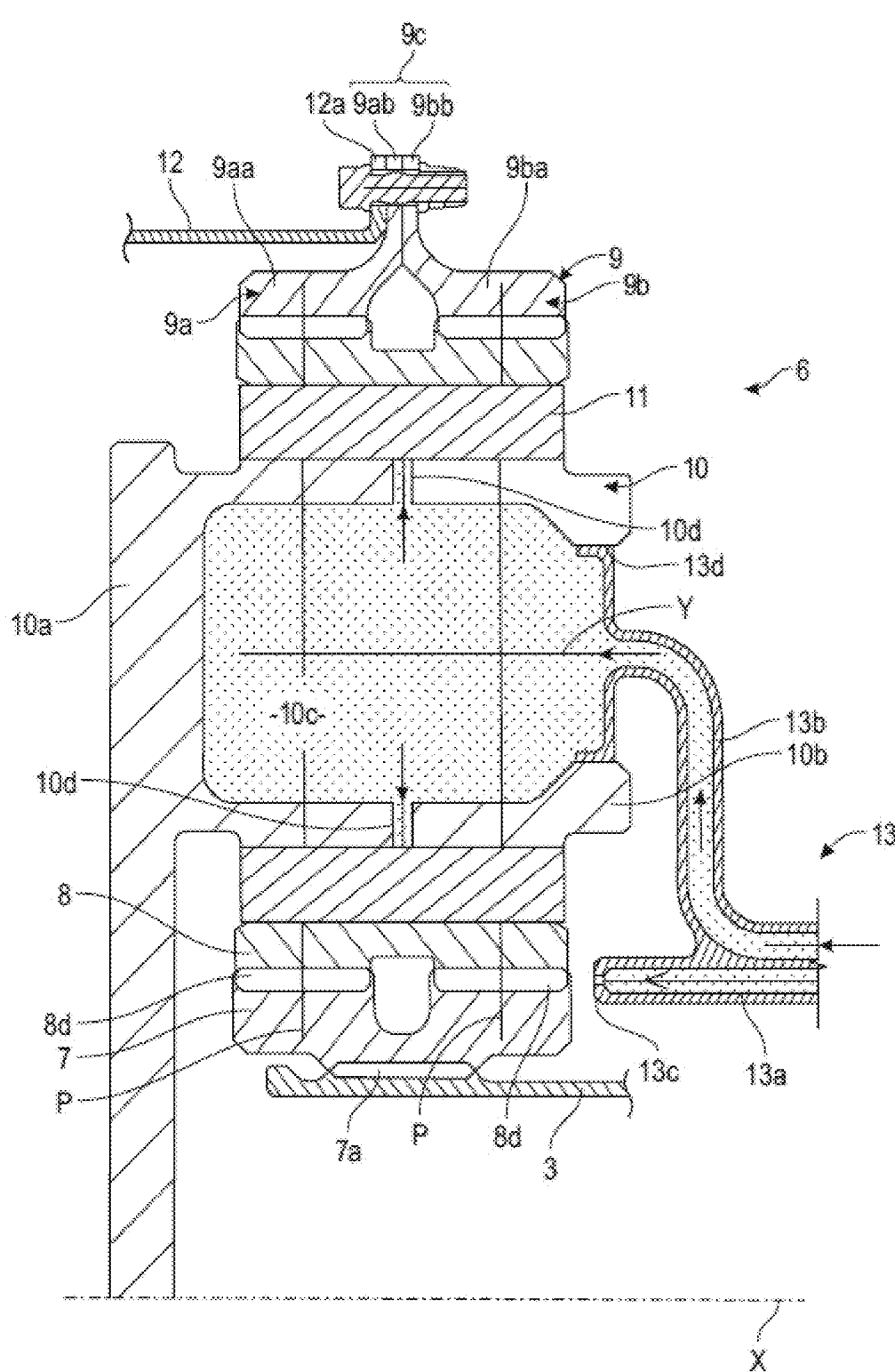

[Fig. 3]
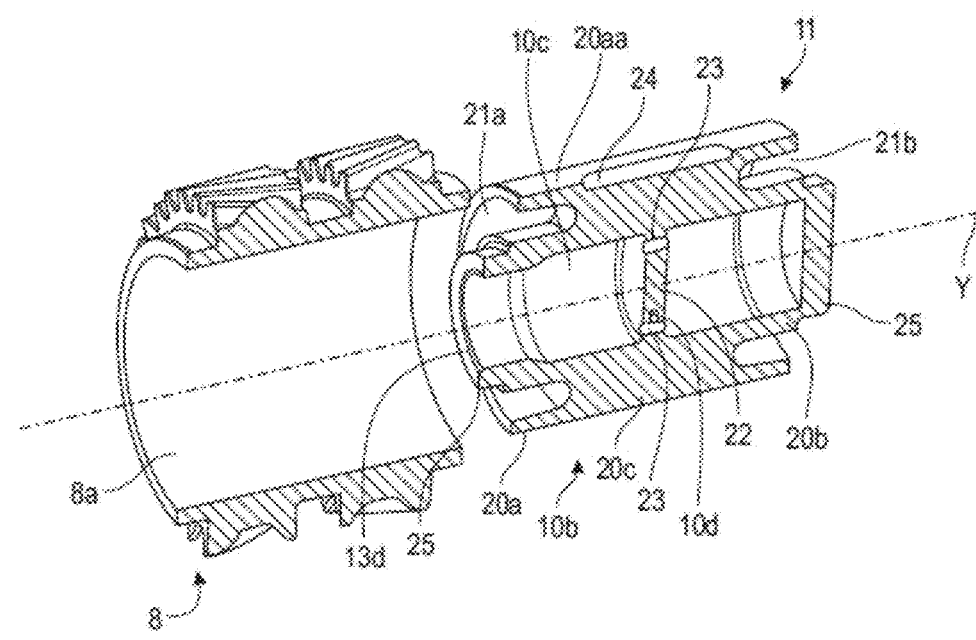
[Fig. 4]
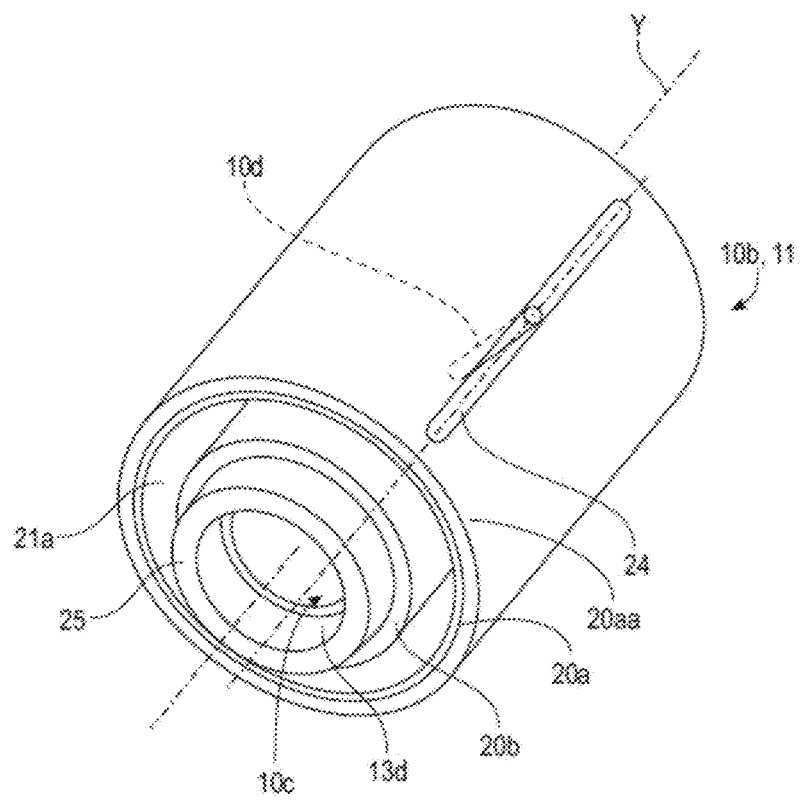

[Fig. 5a]
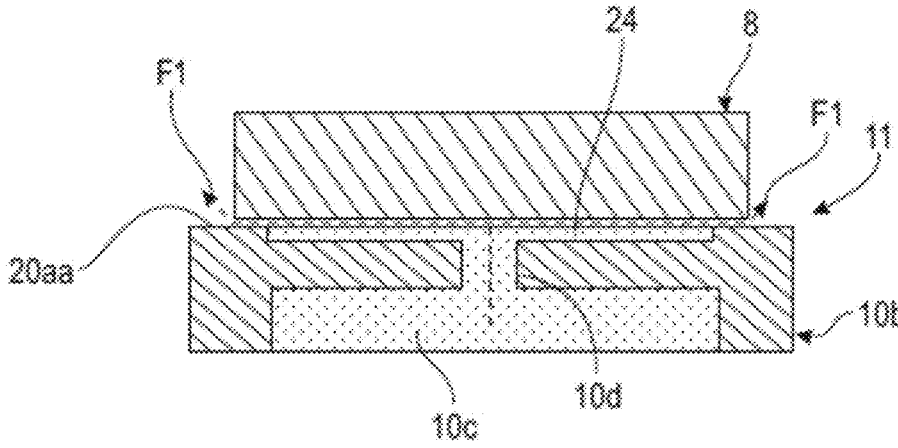
[Fig. 5b]
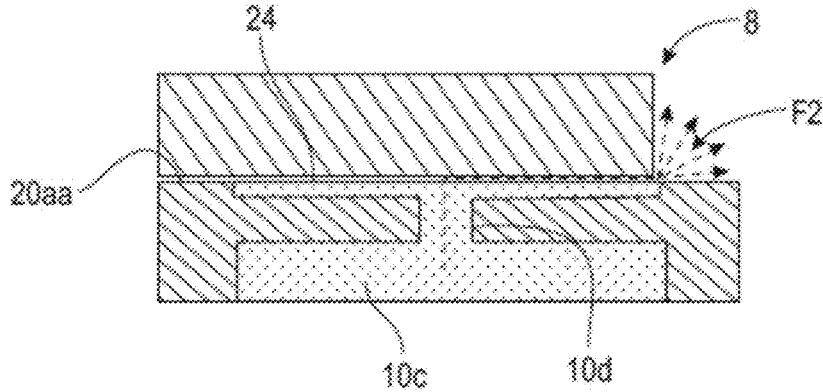
[Fig. 5c]
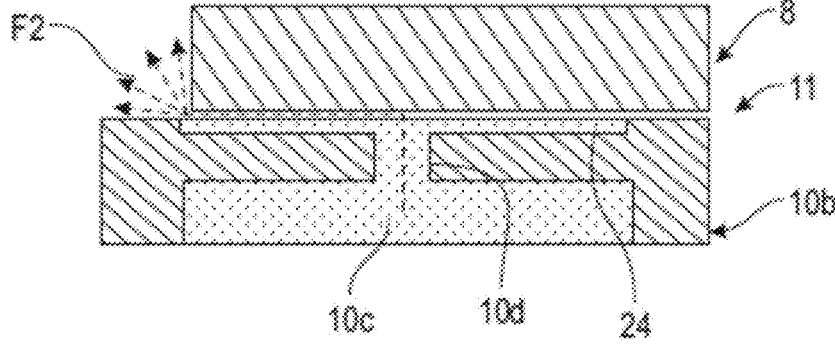

[Fig. 6a]
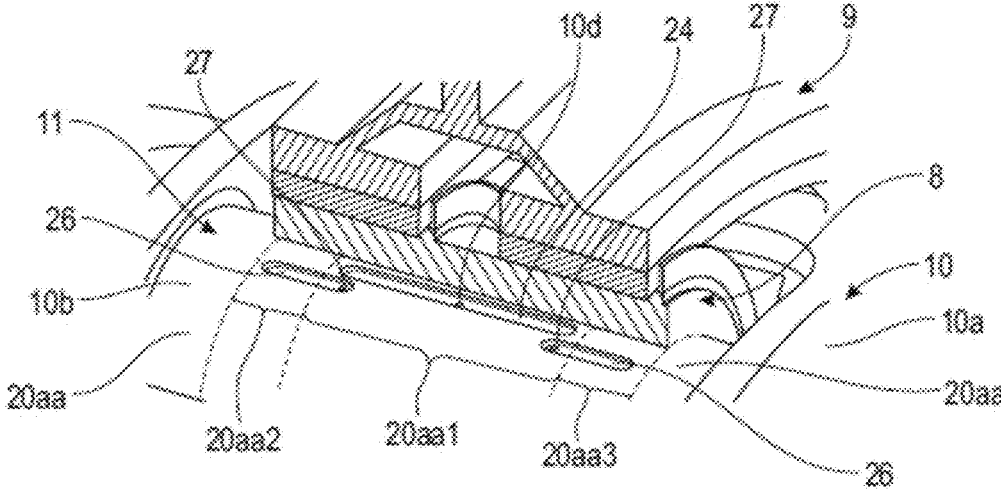
[Fig. 6b]
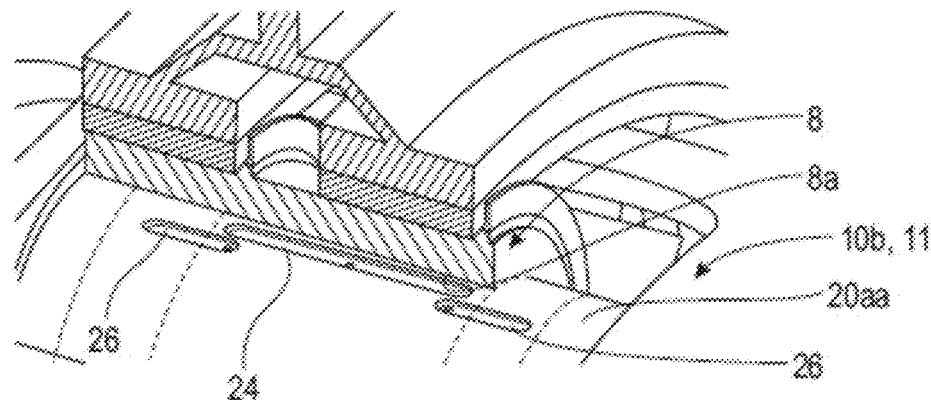
[Fig. 6c]
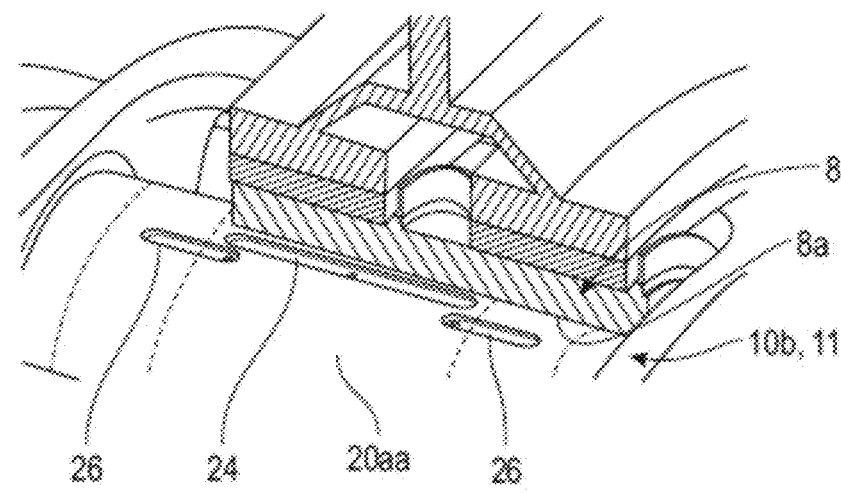

[Fig. 7]
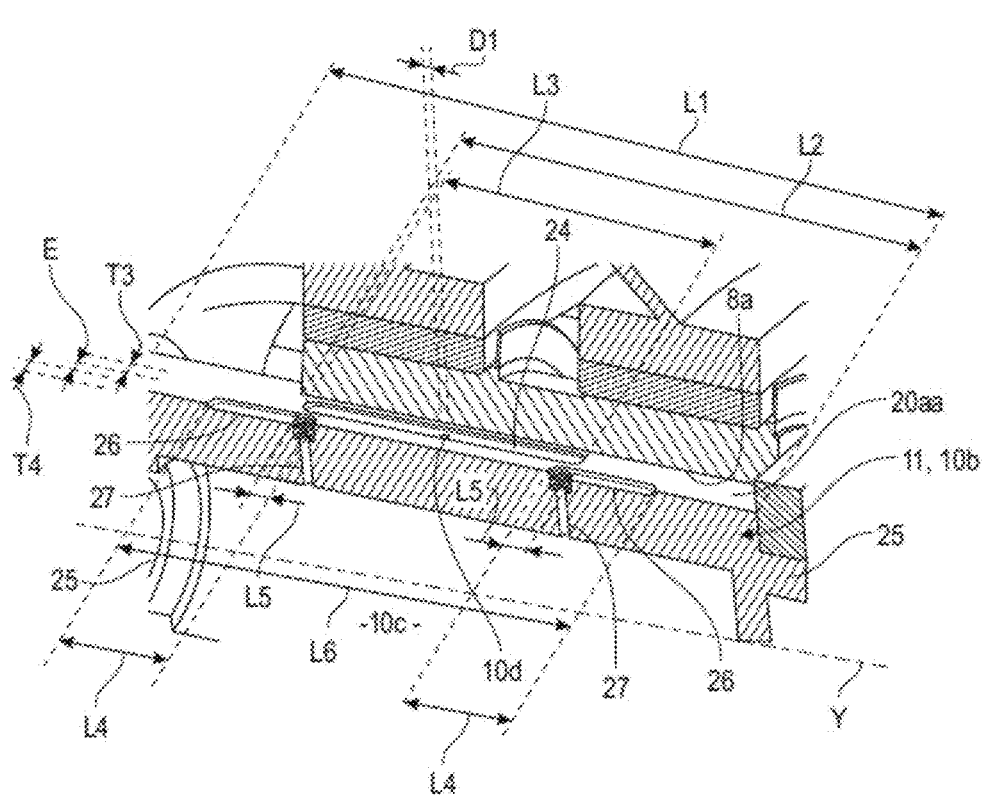
[Fig. 8]
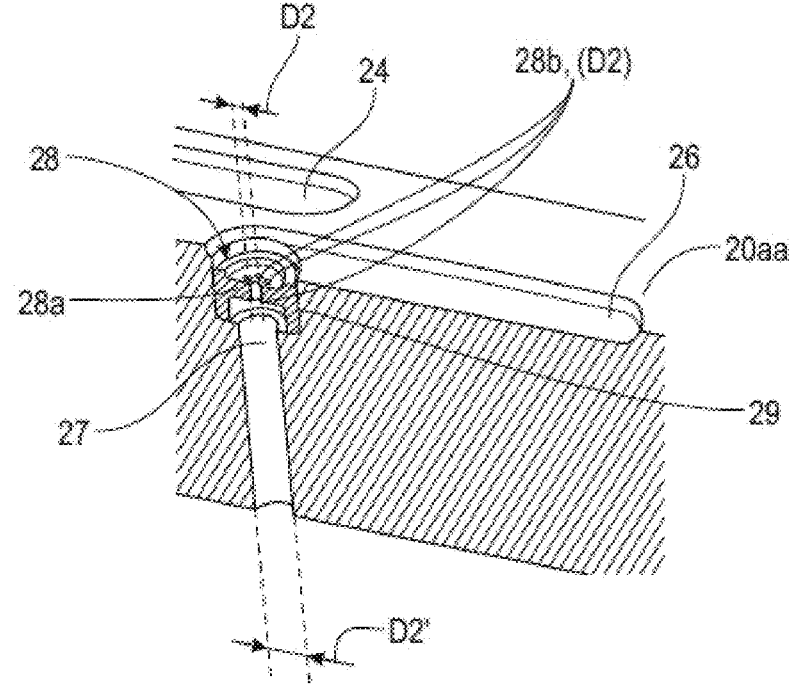

[Fig. 9a]
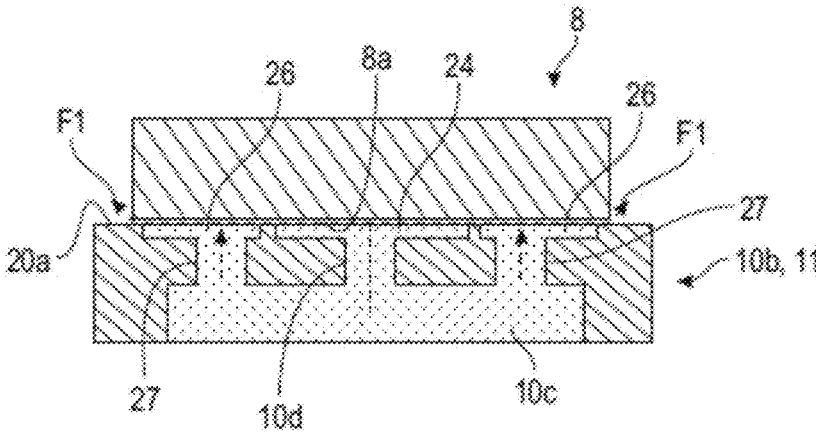
[Fig. 9b]
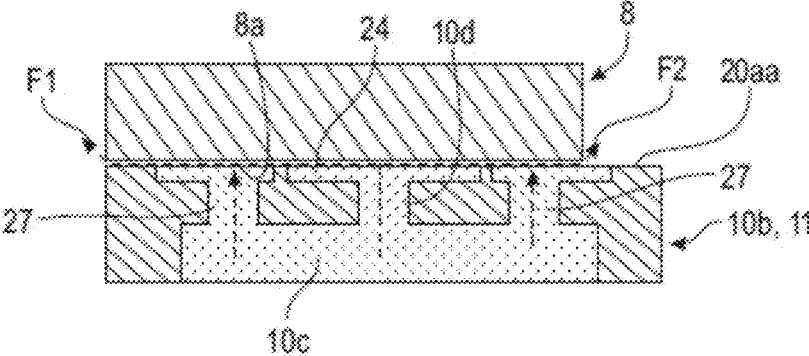
[Fig. 9c]
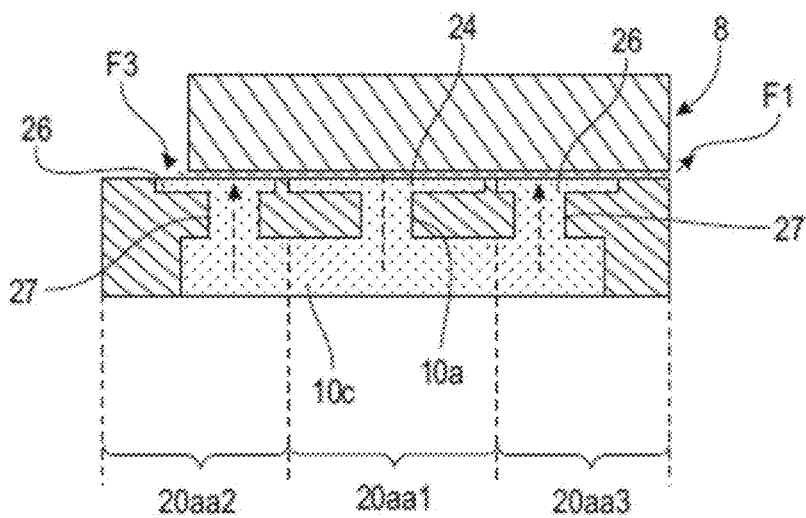

PLAIN BEARING FOR AN AIRCRAFT TURBOMACHINE

TECHNICAL FIELD OF THE INVENTION

This invention relates to a plain bearing for an aircraft turbomachine, and to a mechanical reducer comprising this type of plain bearing.

TECHNICAL BACKGROUND

The prior art comprises in particular the documents FR-A1-2,995,055, FR-A1-3,071,022, WO-A1-2014/037659, DE-U-19,85,822, US-A1-2014/254966, EP-A1-2,383,480, US-B2-10,436,249 and US-B2-6,966,700.

The role of a mechanical reducer is to modify the speed and torque ratio between the input axle and the output axle of a mechanical system.

The new generations of multi-flow turbomachines, particularly those with a high bypass ratio, comprise a mechanical reducer to drive the shaft of a fan or of a propeller. The usual purpose of the reducer is to transform the so-called fast rotation speed of the shaft of a power turbine into a slower rotation speed for the shaft driving the fan or the propeller.

Such a reducer comprises a central pinion, referred to as sun gear, a ring gear and pinions referred to as planet gears, which are engaged between the sun gear and the ring gear. The planet gears are held by a frame referred to as planet carrier. The sun gear, the ring gear and the planet carrier are planetary gears because their axes of revolution coincide with the longitudinal axis X of the turbomachine. The planet gears each have a different axis of revolution equally distributed on the same operating diameter around the axis of the planetary gears. These axes are parallel to the longitudinal axis X.

There are several reducer architectures. In the prior art multi-flow turbomachines uses planetary or epicyclic reducers. In other similar applications, there are so-called differential or compound architectures.

- on a planetary reducer, the planet carrier is stationary and the ring gear is the output shaft of the device which rotates in the opposite direction of the sun gear.
- in an epicyclic reducer, the ring gear is stationary and the planet carrier is the output shaft of the device which rotates in the same direction as the sun gear.
- on a compound reducer, no element is attached in rotation. The ring gear rotates in the opposite direction of the sun gear and of the planet carrier.

The reducers may consist of one or more meshing stages. This meshing is ensured in different ways such as by contact, friction or magnetic field. There are several types of meshing by contact such as straight or herringbone toothings.

The planet gears are guided in rotation by bearings, which may be plain bearings or rolling bearings. The present application relates to a plain bearing that may be used to guide a planet gear or any other mechanical element of a turbomachine. In this application, plain bearings and hydrodynamic bearings have the same meaning.

A plain or hydrodynamic bearing comprises a tubular body whose internal cavity is supplied with lubricating oil. Oil is supplied to the internal cavity and is routed through a supply channel to a main lubrication groove formed on an external cylindrical surface of the body.

The main lubrication groove is located on a middle portion of the external surface of the body and has a straight and elongated shape along the main axis of the plain bearing, which is the axis of revolution of its cylindrical surface.

In the case of guiding a planet gear, the planet gear comprises an internal cylindrical surface which extends around the external surface of the body of the bearing. In the normal operating position, the internal surface of the planet gear covers and closes the lubrication groove. However, during operation, the planet gear may move axially on the plain bearing. During these movements, the planet gears may adopt an axial position on the plain bearing wherein the internal surface of the planet gear no longer covers a longitudinal end of the lubrication groove, which is therefore no longer closed. The oil contained in the groove then escapes from the groove at a high and uncontrolled flow rate. The movements of the planet gear on the plain bearing therefore give rise to fears of substantial oil leaks in the plain bearing, resulting in excessive oil consumption.

One solution to this problem could be to reduce the length of the supply groove to prevent it from being uncovered during the relative movements of the planet gear and of the plain bearing. However, this solution would not be satisfactory because it would not guarantee an effective lubrication of the bearing. There is a risk that the longitudinal ends of the bearing will not be sufficiently lubricated, which could lead to seizure due to contact between the planet gear and the bearing, and reduce the service life of the bearing.

The present invention provides a simple, effective and economical solution to this problem in the prior art.

SUMMARY OF THE INVENTION

The invention relates to a plain bearing for an aircraft turbomachine, this plain bearing comprising a tubular body with a main axis and comprising:

- an external cylindrical surface extending around the axis over a major portion of an axial dimension of the body,
- two tubular mounting end caps located respectively at two opposite ends of the body along the axis,
- an internal cavity configured to receive oil and opening into the center of at least one of the end caps,
- a main lubrication groove which is recessed on the external surface of a middle portion of the body and which has an elongate shape along the axis, and
- a main channel for supplying oil to the main groove, which provides a fluid communication between the cavity and the main groove, characterized in that the body comprises two opposite end portions separated from each other by the middle portion of the body, at least one of these end portions comprising a secondary lubrication groove which is recessed in the external surface and which has an elongate shape along the axis and which is fluidly independent of the main groove, and in that the body further comprises a secondary channel for supplying oil to the or each secondary groove, which provides a fluid communication between the cavity and the secondary groove.

The plain bearing thus comprises a main lubrication groove and at least one secondary lubrication groove. The main and secondary grooves are independent, i.e. they do not communicate with each other and are supplied by separate channels. The primary groove extends along the middle portion of the body and the or each secondary groove extends along an end portion of the body, thereby allowing to lubricate a major portion of the length of the external surface of the body during operation. Furthermore, if a planet gear moves, for example on the plain bearing, the secondary groove or one of the secondary grooves may no longer be covered by the planet gear. Oil will escape and leak from the secondary groove. However, as this secondary groove is supplied by a channel that has a smaller passage cross-section than that of the supply channel of the main groove, the oil will escape at a lower flow rate. Most of the supply oil to the bearing will continue to supply the main groove and a small amount of this supply oil will leak through the exposed secondary groove. The reduction in the aforementioned passage cross-section means that sufficient pressure may be maintained in the internal cavity of the bearing to ensure the supply of oil to the main groove, thereby reducing the risk of seizure.

The invention thus allows to guarantee the supply of oil to the main groove and to limit the oil leakages at the longitudinal ends of the plain bearing during relative movements between the plain bearing and the element it guides.

The invention is compatible with a single-stage or multi-stage reducer. It is compatible with an epicyclic, planetary or differential reducer. It is compatible with herringbone toothings in particular. Finally, it is compatible with all types of planet carrier, whether one-part or cage and cage carrier type.

The plain bearing according to the invention may comprise one or more of the following characteristics, taken in isolation from each other, or in combination with each other:

the body of the plain bearing is one-part said secondary channel has a minimum passage cross-sectional smaller than that of the main channel;

the main and secondary grooves are straight and parallel;

the or each secondary groove has a longitudinal dimension less than that of the main groove, and preferably less than half that of the main groove;

the or each secondary groove extends into the external surface of the middle portion of the body to create an area of mutual overlap with the main groove;

the main channel has no restrictor;

the or each secondary channel comprises a restrictor which is fitted and attached to the body; in the present application, by (fluid) restrictor is meant a device which is used to reduce the passage cross-section for the passage of a fluid; a restrictor allows the passage of fluid but in a limited or controlled manner; in the case of an aircraft turbomachine, a restrictor is housed in a bore in a part in order to control the quantity of fluid passing through this bore, for example;

the main channel is located substantially in the middle of the main groove, and the secondary channel is located at a longitudinal end of the or each secondary groove, this longitudinal end being located on the side of the main groove;

the bearing comprises a main groove and two secondary grooves, the two secondary grooves being axially aligned with each other and being located at a predetermined distance from the main groove;

the distance is less than or equal to a width of the main groove;

the main groove has a width which is between $1.D1$ and $2.D1$, $D1$ being an internal diameter of said main channel;

the or each secondary groove has a width of between $1.D2$ and $3.D2$, $D2$ being an internal diameter of said secondary channel.

The present invention also relates to an assembly comprising a plain bearing according to one of the preceding claims, and a planet gear of mechanical reducer, this planet gear comprising a tubular body having a main axis and comprising:

at least one external toothing extending around the axis, and an internal cylindrical surface extending around the axis over a major portion of an axial dimension of the body, this internal surface being configured to extend around the external surface of the body of the plain bearing.

Advantageously, the internal surface of the body of the planet gear has a length less than that of the external surface of the body of the plain bearing, and wherein the main and secondary grooves extend over a longitudinal dimension of the body of the plain bearing which is between 95%. L1 and 99%. L1, L1 being the length of the internal surface of the body of the planet gear.

This invention also relates to a mechanical reducer for a turbomachine, in particular for an aircraft, comprising a sun gear, a ring gear extending around the sun gear, and assemblies as described above, the planet gears of these assemblies being in mesh with the sun gear and the ring gear.

The invention also relates to a turbomachine, in particular for an aircraft, comprising a mechanical reducer as described above.

BRIEF DESCRIPTION OF THE FIGURES

Further characteristics and advantages will be apparent from the following description of a non-limiting embodiment of the invention with reference to the appended drawings wherein:

FIG. 1 is a schematic axial cross-sectional view of a turbomachine using the invention, FIG. 2 is a partial schematic view of a mechanical reducer in axial cross-section, FIG. 3 is a schematic perspective view and axial cross-section of a plain bearing and a planet gear of a mechanical reducer, FIG. 4 is a schematic perspective view of the plain bearing in FIG. 3, FIGS. 5a-5c are highly schematic axial sectional half-views of a plain bearing and a planet gear according to the prior art, and illustrate different axial positions of the planet gear on the plain bearing, FIGS. 6a-6c are highly schematic half-views in perspective and axial cross-section of a plain bearing and a planet gear according to the invention, and illustrate different axial positions of the planet gear on the plain bearing, FIG. 7 is a larger-scale view of a portion of FIG. 6c, FIG. 8 is an even larger-scale view of a portion of FIG. 6c, FIGS. 9a-9c are similar views to FIGS. 6a-6c and illustrate different axial positions of the planet gear on the plain bearing in the context of the present invention.

DETAILED DESCRIPTION OF THE INVENTION

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven to the LP shaft 3 by means of a reducer 6. This reducer 6 is generally of the planetary or epicyclic type.

Although the following description concerns a reducer of the planetary or epicyclic type, it also applies to a mechanical differential in which the three elements, namely the planet carrier, the ring gear and the sun gear, may be rotatable, the rotational speed of one of these elements depending in particular on the difference in speed of the other two elements.

The reducer 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the reducer 6. This enclosure E is here closed upstream by seals at the level of a bearing allowing the passage of the fan shaft 4, and downstream by seals at the level of the passage of the LP shaft 3.

FIG. 2 shows a reducer 6 which may take the form of different architectures depending on whether certain parts are stationary or in rotation. The input of the reducer 6 is connected to the LP shaft 3, for example by means of internal splines 7a. Thus the LP shaft 3 drives a planetary pinion referred to as the sun gear 7. Classically, the sun gear 7, whose axis of rotation is coincident with that of the turbomachine X, drives a series of pinions referred to as planet gears 8, which are equally distributed on the same diameter around the axis of rotation X. This diameter is equal to twice the operating center distance between the sun gear 7 and the planet gears 8. The number of planet gears 8 is generally defined between three and seven for this type of application.

The assembly of the planet gears 8 is held by a frame referred to as planet carrier 10. Each planet gear 8 rotates around its own axis Y, and meshes with the ring gear 9.

In the output we have:

in an epicyclic configuration, the assembly of the planet gears 8 drives the planet carrier 10 in rotation around the axis X of the turbomachine. The ring gear is attached to the engine casing or stator 5 via a ring gear carrier 12 and the planet carrier 10 is attached to the shaft of the fan 4.

in a planetary configuration, the assembly of the planet gears 8 is maintained by a planet carrier 10 which is attached to the engine casing or stator 5. Each planet gear drives the ring gear which is fitted to the fan shaft 4 via a ring gear carrier 12.

Each planet gear 8 is mounted so that it may rotate freely by means of a bearing 11, for example a hydrodynamic rolling or plain bearing. In the case of a plain bearing, the bearing 11 comprises a tubular body 10b and the tubular bodies of the various plain bearings are positioned relative to one another and are carried by a structural frame 10a of the planet carrier 10. The number of bearings 11 is equal to the number of planet gears 8. For reasons of operation, assembly, manufacture, inspection, repair or replacement, the bearings 11 (and in particular the tubular bodies 10b) and the frame 10a may be separated into several parts.

For the same reasons mentioned above, the toothing 8d of a reducer may be separated into several propellers each with a median plane P. In our example, we detail the operation of a reducer with several propellers with one ring gear separated into two half-ring gears:

an upstream half-ring gear 9a consisting of a rim 9aa and an attachment half-flange 9ab. On the rim 9aa there is the upstream propeller of the toothing of the reducer. This upstream propeller meshes with that of the planet gear 8 which meshes with that of the sun gear 7.

a downstream half-ring gear 9b consisting of a rim 9ba and an attachment half-flange 9bb. On the rim 9ba is the downstream propeller of the toothing of the reducer. This downstream propeller meshes with that of the planet gear 8 which meshes with that of the sun gear 7.

If the propeller widths vary between the sun gear 7, the planet gears 8 and the ring gear 9 because of the toothing overlaps, they are all centered on a median plane P for the upstream propellers and on another median plane P for the downstream propellers.

The attachment half-flange 9ab of the upstream ring gear 9a and the attachment half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 describe the conveying of the oil in the reducer 6. The oil arrives in the reducer 6 from the stator portion 5 in the turbine stator 13 by different means which will not be specified in this view because they are specific to one or several types of architecture. The turbine stator is divided into two portions, each of which is generally made up of the same number of planet gears. The function of the injectors 13a is to lubricate the toothings and the function of the arms 13b is to lubricate the bearings 11. The oil is conveyed towards injectors 13a and emerges through ends 13c so as to lubricate the toothings of the planet gears 8, the sun gear 7 and also the ring gear 9 with oil. Oil is also conveyed towards the arm 13b and flows via the supply mouth 13d of the body 10b into an internal cavity 10c of the latter. The oil then circulates in this cavity 10c to supply oil passage orifices 10d up to an external cylindrical surface for guiding the corresponding planet gear.

FIGS. 3 and 4 show a more specific example of a plain bearing 11 and its tubular body 10b for a reducer planet gear 8.

The tubular body 10b comprises two coaxial annular walls 20a, 20b which extend around each other and are connected by an annular core 20c.

The internal annular wall 20b has axial ends defining tubular end caps 25 for mounting on the planet carrier 10. At least one of these axial ends is open to also define the aforementioned supply mouth 13d configured to receive oil supplied by the turbine stator (not shown). The internal wall 20b also defines the internal cavity 10c for receiving lubricating oil.

The external annular wall 20a has an axial length or dimension, measured along the axis Y, which is close to that of the wall 20b. The wall 20a comprises an external cylindrical surface 20aa which is configured to define, with an internal cylindrical surface 8a of the bearing 8, an annular space for receiving oil and forming an oil film with a view to forming the plain or hydrodynamic bearing 11.

The core 20c has a shorter length measured in the same way, so that the axial ends of the walls 20a, 20b define annular grooves 21a, 21b between them. This configuration allows to give the body 10b a degree of flexibility at the level of each of its axial ends.

The body 10b also comprises a transverse bulkhead 22 located in the cavity 10c, substantially in the middle relative to the extent of the cavity along the axis Y. This partition 22 is connected at its periphery to the internal surface of the wall 20a and comprises ducts 23 for putting into fluid communication the two segments of the cavity 10c between which the bulkhead 22 extends.

The body 10b comprises at least one main channel 10d for the passage of lubricating oil from the cavity 10c to the external periphery of the body 10b, and in particular to a main lubrication groove 24 formed or recessed in the surface 20aa (see FIG. 4).

In the example shown, this channel 10d is formed in the middle of the body 10b, relative to the extent of the body along the axis Y, and extends from one of the ducts 23 to the surface 20aa, passing through the bulkhead 23, the internal wall 20b, the core 20c and finally the external wall 20a.

The cavity 10c is continuously supplied with oil during operation. This oil enters the cavity 10c and then the ducts 23 and is conveyed through the main channel 10d to the lubrication groove 24. The centrifugal forces applied to the planet carrier 10 and to the bodies 10b during operation are sufficient to ensure this oil circulation.

The lubrication groove 24 extends over a major portion of the length of the body 10b of the plain bearing 11 and is closed by the internal surface 8a of the planet gear 8 when the latter is in its normal operating position illustrated in FIG. 5a. The lubricating oil that supplies the main groove 24 circulates between the surfaces 20aa, 8a and escapes at the longitudinal ends of the bearing 11 at a controlled flow rate (arrows F1 in FIG. 5a).

As mentioned above, during operation, the planet gear 8 may undergo displacements in the axial direction and adopt extreme positions illustrated in FIGS. 5b and 5c wherein one axial end of the main groove 24 may no longer be covered by the planet gear 8 and release oil at a too high flow rate. In FIG. 5b, the planet gear 8 has adopted an extreme axial position wherein a first longitudinal end of the groove 24 (on the right of the drawing) is exposed and uncontrolled oil leaks occur at the level of this end (arrows F2). In FIG. 5c, the planet gear 8 has adopted an opposite extreme axial position wherein a second opposite longitudinal end of the groove 24 (on the left of the drawing) is exposed and uncontrolled oil leaks occurs at the level of this end (arrows F2).

The present invention offers a solution to this problem.

One embodiment of the invention is illustrated in FIG. 6a and following.

The plain bearing 11 according to the invention comprises a tubular body 10b, preferably in one-part, having a main axis Y and comprising:

an external cylindrical surface 20aa extending around the axis Y over a major portion of an axial dimension of the body 10b (at least 90% in the example shown), two tubular mounting end caps 25 located respectively at two opposite ends of the body 10b along the axis Y, an internal cavity 10c configured to receive oil and opening into the center of at least one of the end caps 25, a main lubrication groove 24 which is formed or recessed on the external surface 20aa of a middle portion 20aa1 of the body 10b and which has an elongate, and preferably straight, shape along the axis Y, and a main channel 10d for supplying oil to the main groove 24, which provides a fluid communication between the cavity 10c and the main groove 14.

In the example shown, the internal surface 8a of the body of the planet gear 8 has a length L1 measured along the axis Y. The external surface 20aa of the body 10b of the bearing 11 has a length L2 measured along the axis Y (see FIG. 7).

The main groove 24 has a length L3 measured along the axis Y and a width T3 measured in a plane perpendicular to this axis (FIG. 7).

In the example shown, the main channel 10d supplies the main groove 24 at its center. The main channel 10d may have a constant internal diameter, D1.

The figures show that:

L2 is less than L1 and represents, for example, 60 to 90% of L1,

L3 is less than L2 and represents, for example, 60 to 80% of L2,

D1 is less than T3; preferably 1.D1<T3<3.D1,

L3 is between 10.T3 and 50.T3.

However, these parameters are optional. They may be used in combination or in isolation for the purposes of this invention. Each offers advantages in terms of circulation and oil consumption.

According to the invention, the body comprises two opposite end portions 20aa2, 20aa3 separated from each other by the middle portion 20aa1 of the body 10b. At least one of these end portions 20aa2, 20aa3 comprises a secondary lubrication groove 26 which is recessed in the external surface 20aa and which has an elongate, and preferably straight, shape along the axis Y and which is independent of the main groove 24. The grooves 24, 26 are preferably parallel to each other and to the axis Y.

In the example shown, each of the end portions 20aa2, 20aa3 comprises a secondary groove 26. The plain bearing 11 thus comprises a main groove 24 and two secondary grooves 26. Alternatively, the plain bearing 11 could comprise a secondary groove 26 on only one of its end portions 20aa2, 20aa3.

The body 10b of the plain bearing 11 also comprises a secondary channel 27 for supplying oil to the or each secondary groove 26, which provides a fluid communication between the cavity 10c and the secondary groove 26.

Each secondary groove 26 has a length L4 measured along the axis Y and a width T4 measured in a plane perpendicular to this axis.

In the example shown, the secondary channel 27 supplies each secondary groove 26 via one of its longitudinal ends. It is the longitudinal end located on the side of the main groove 24 or of the other secondary groove 26, which is supplied by the secondary channel 27. It is thus understood that if one of the secondary grooves 26 is exposed, it is the longitudinal end of this groove opposite its oil-supplied end that will be exposed, which is advantageous for limiting oil leaks during operation.

Each secondary channel 27 may have a constant internal diameter, D2.

The figures show that:

L4 is less than L3 and represents, for example, 20 to 50% of L3,

T4 is similar or even identical to T3; preferably, 1.D2<T3<3.D2.

Furthermore, E is the distance between each secondary groove 26 and the main groove, measured in a plane perpendicular to the axis Y. This distance E is controlled and is less than T3 and T4. Furthermore, in the example shown, the two secondary grooves 26 are located on the same side of the main groove 24 and are axially aligned with each other, so the distance E is identical for the two secondary grooves 26.

The secondary supply channel 27 in each secondary groove 26 preferably has a smaller minimum passage cross-section than that of the main channel 10c. This minimum cross-section may be achieved by a channel 27 with a smaller internal diameter D2 (i.e. D2 is less than or equal to D1). Advantageously, this passage cross-section is obtained by a fluid restrictor 28 which is fitted and attached in each secondary channel 27. In the latter case, the internal diameter D2' of each secondary channel 27 may be similar or identical to the internal diameter D1 of the main channel 26 and the minimum passage cross-section in each secondary channel 27 is defined by the restrictor 28 (see FIG. 8). D2' here is less than T4.

FIGS. 7 and 8 show that each of the restrictors 28 is mounted in a bore 29 in the body 10*b* located at the intersection between the secondary groove 26 and its channel 27. The restrictor 28 may be shrunk into the bore 29, for example. In this case, the bore 29 has a diameter greater than D2' and less than the width T4.

Each restrictor 28 may comprise a one-part tubular body comprising a transverse bulkhead 28*a* pierced with one or more orifices 28*b* of predetermined internal diameter D3. This means that the restrictor 28 reduces the passage cross-section in the channel 27 wherein it is mounted. Upstream of the restrictor 28, the passage cross-section is equal to $\pi.(D2/2)^2$. At the level of the restrictor 28, the passage cross-section becomes $k.\pi.(D3/2)^2$, with k the number of orifices 28*b*.

Advantageously, the main 24 and secondary 26 grooves overlap axially as shown in FIGS. 6 and 7. This means that each secondary groove 26 extends axially into the external surface 28*aa* of the middle portion 28*aa*1 to have an end portion which overlaps (in a tangential direction about the axis Y) an end portion of the main groove 24.

The overlap length is referred to as L5 and may represent between 10 and 30% of L4 (see FIG. 7).

Whatever the position of the planet gear 8, as long as it covers the main groove 24, it will cover at least a portion of the or each secondary groove 26. This allows to ensure a continuous lubrication of the plain bearing over the entire length of the grooves.

L6 is the longitudinal dimension of the body 10*b* of the plain bearing 11 over which the main 24 and secondary 26 grooves extend. In the example shown, L6 is equal to L3+2.L4−2.L5.

Advantageously, L6 is between 95%. L1 and 99%. L1, which allows the grooves to supply directly almost the entire length of the internal surface 8*a* of the planet gear 8.

FIGS. 6*a* to 6*c* and 9*a* to 9*c* show the relative axial positions of a planet gear 8 on the plain bearing 11 according to the embodiment described above.

In the normal operating position (FIGS. 6*a* and 9*a*), the planet gear 8 is located in the middle of the plain bearing 11 and the grooves 24, 26 are closed by the internal surface 8*a* of the planet gear 8. The lubricating oil which supplies the grooves 24, 26 circulates between the surfaces 20*aa*, 8*a* and escapes at the longitudinal ends of the bearing 11 at a controlled flow rate (arrows F1).

In FIGS. 6*b* and 9*b*, the planet gear 8 has adopted an extreme axial position wherein a portion of one of the grooves 26 (on the left of the drawing) is exposed and controlled oil leakage occurs at the level of this end (arrows F3) thanks to the restriction of the diameter or of the passage cross-section of the secondary channel 27. In FIGS. 6*c* and 9*c*, the planet gear 8 has adopted an opposite extreme axial position wherein a portion of the other of the grooves 26 (on the right of the drawing) is exposed and controlled oil leakage occurs at the level of this end (arrows F3) thanks to the restriction of the diameter or of the passage cross-section of the secondary channel 27. Whatever the axial position of the planet gear 8 on the bearing 11, the main groove 24 is therefore always covered by the planet gear 8 and supplies the interface between the bearing 11 and the planet gear 8 continuously and at a sufficient flow rate.

By restricting the diameter or the passage cross-section of each secondary channel 27, leakage may be limited to a flow rate that is only slightly greater than the flow rate required for operation of the bearing 11 (e.g. greater by around 5%). It also allows to maintain a sufficient pressure in the internal cavity 10*c* of the bearing 11 to ensure the supply of oil to the main groove 24, which reduces the risk of seizure.

When using the bearing 11 according to the invention in a mechanical reducer 6, the flow rate sufficient for the reducer is therefore known and controlled in all phases of flight and does not require the circuit to be oversized for phases with high displacement.

The invention claimed is:

1. A plain bearing for an aircraft turbomachine, the plain bearing comprising a tubular body with a main axis and comprising:

an external cylindrical surface extending around the axis over a major portion of an axial dimension of the body, two tubular mounting end caps located respectively at two opposite ends of the body along the axis, an internal cavity configured to receive oil and opening into the center of at least one of the end caps, a main lubrication groove which is recessed on the external surface of a middle portion of the body and which has an elongate shape along the axis, and a main channel for supplying oil to the main groove, which provides a fluid communication between the cavity and the main groove, wherein the body comprises two opposite end portions separated from each other by the middle portion of the body, at least one of the two opposite end portions comprising a secondary lubrication groove which is recessed in the external surface and which has an elongate shape along the axis and which is fluidly independent of the main groove, each secondary groove having a longitudinal dimension less than that of the main groove, each secondary groove extending into the external surface of the middle portion of the body to create an area of mutual overlap with the main groove, and in that the body further comprises a secondary channel for supplying oil to each secondary groove, which provides a fluid communication between the cavity and the secondary groove, said secondary channel having a minimum passage cross-section smaller than that of the main channel.

2. The plain bearing according to claim 1, wherein the main and the secondary grooves are straight and parallel.

3. The plain bearing according to claim 1, wherein each secondary groove has a longitudinal dimension less than half that of the main groove.

4. The plain bearing according to claim 1, wherein the main channel has no restrictor.

5. The plain bearing according to claim 1, wherein each secondary channel comprises a restrictor which is fitted and attached to the body.

6. The plain bearing according to claim 1, wherein the main channel is located substantially in the middle of the main groove, and the secondary channel is located at a longitudinal end of each secondary groove, this longitudinal end being located on the side of the main groove.

7. The plain bearing according to claim 1, wherein it comprises a main groove and two of said each secondary grooves, the two secondary grooves being axially aligned with each other and being located at a predetermined distance from the main groove.

8. The plain bearing according to claim 7, wherein the distance is less than or equal to a width of the main groove.

9. The plain bearing according to claim 1, wherein the body of the plain bearing is in one-part.

10. The plain bearing according to claim 1, wherein the main groove has a width which is between D1 and 2*D2, D1 being an internal diameter of said main channel.

11. The plain bearing according to claim 1, wherein each secondary groove has a width which is between D2 and 3*D2, D2 being an internal diameter of said secondary channel.

12. An assembly comprising a plain bearing according to claim 1, and a planet gear of mechanical reducer, the planet gear comprising a tubular body having a main axis and comprising:

at least one external toothing extending around the axis, and an internal cylindrical surface extending around the axis over a major portion of an axial dimension of the body, this internal surface being configured to extend around the external surface of the body of the plain bearing.

13. The assembly according to claim 12, wherein the internal surface of the body of the planet gear has a length less than that of the external surface of the body of the plain bearing, and wherein the main and secondary grooves extend over a longitudinal dimension of the body of the plain bearing which is between 95% of L1 and 99% of L1, L1 being the length of the internal surface of the body of the planet gear.

14. A mechanical reducer for a turbomachine comprising a sun gear, a ring gear extending around the sun gear, and assemblies as claimed in claim 12, the planet gears of said assemblies being in mesh with the sun gear and the ring gear.

15. A turbomachine comprising a mechanical reducer according to claim 14.

\* \* \* \* \*